(12) United States Patent
Torriani et al.

(10) Patent No.: US 6,786,989 B2
(45) Date of Patent: Sep. 7, 2004

(54) SEALING

(75) Inventors: Laurent Torriani, Biel (CH); Marcel Aeschlimann, Ligerz (CH)

(73) Assignee: Woodwelding AG, Zurich (CH)

( * ) Notice: Subject to any disclaimer, the term of this patent is extended or adjusted under 35 U.S.C. 154(b) by 0 days.

(21) Appl. No.: 10/296,365

(22) PCT Filed: May 23, 2001

(86) PCT No.: PCT/CH01/00318
§ 371 (c)(1),
(2), (4) Date: Nov. 22, 2002

(87) PCT Pub. No.: WO01/89809
PCT Pub. Date: Nov. 29, 2001

(65) Prior Publication Data
US 2003/0145933 A1 Aug. 7, 2003

(30) Foreign Application Priority Data
May 26, 2000 (CH) ............................................. 1068/00

(51) Int. Cl.$^7$ ............................................. B29C 65/08
(52) U.S. Cl. ................. 156/73.1; 156/380.2; 156/580.2
(58) Field of Search ........................... 156/73.1, 308.2, 156/580.1, 580.2; 228/1.1, 110.1

(56) References Cited

U.S. PATENT DOCUMENTS

| | | | |
|---|---|---|---|
| 4,975,133 A | * | 12/1990 | Gochermann ............... 156/73.1 |
| 5,840,154 A | | 11/1998 | Wittmaier |
| 6,120,629 A | * | 9/2000 | Shannon et al. ............ 156/73.1 |
| 6,454,890 B1 | * | 9/2002 | Couillard et al. ........... 156/73.1 |
| 6,517,650 B2 | * | 2/2003 | Couillard et al. ........... 156/73.1 |

FOREIGN PATENT DOCUMENTS

| | | |
|---|---|---|
| DE | 30 45 706 A1 | 7/1982 |
| DE | 257 797 A1 | 6/1988 |
| DE | 38 28 340 A1 | 7/1989 |
| DE | 43 03 092 A1 | 8/1994 |
| FR | 2 455 502 A | 11/1980 |

OTHER PUBLICATIONS

Patent Abstracts of Japan, Method for Bonding Together Metal and Rubber or Resin, Publication No. 56139918, Publication Date: Oct. 31, 1981.

WO 01/09445 A2 Technology for Attaching Facing System to Insulation Product, Publication Date Feb. 8, 2001.

* cited by examiner

Primary Examiner—James Sells
(74) Attorney, Agent, or Firm—Rankin, Hill, Porter & Clark LLP

(57) ABSTRACT

A method for sealing a surface (13) of a body (11), wherein a thin material (21) is applied to the surface (13), and the material is connected to the surface by melting due to mechanical stimulation.

14 Claims, 3 Drawing Sheets

SEALING

BACKGROUND OF THE INVENTION

1. Field of the Invention

The present invention generally concerns a sealing method and, more particularly, toward a method for sealing one surface to another surface using an intermediate temporarily meltable article.

2. Description of Related Art

There are various known methods for sealing surfaces. These are based on the application of a protecting layer by means of varnishing or by gluing. The disadvantage of these methods is that, in particular, edges and corners of chipboard, parquet floors or wood fiberboards cannot be sealed sufficiently. Thus, for example, on a correspondingly treated parquet floor the problem arises that moisture penetrates, especially through the lateral surfaces of the boards, which causes moisture expansion of the material. In addition these methods are complicated, costly, and inflexible, and require complex apparatuses.

SUMMARY OF THE INVENTION

It is an object of the invention to create a method that avoids the named problems.

The sealing method according to the invention is based on applying a thin material to the surface to be sealed and on connecting the material to this surface by temporary melting using heat, which is caused by mechanical stimulation (by means of a piezo-element). The thin material is, for example, a film (or foil) material or a strip. The thin material is connected adhesively to the body to be sealed or to its surface, respectively, by means of partial, temporary melting, such that a permanent sealing is achieved, which guarantees a sufficient sealing against moisture and other environmental influences. The temporary melting is advantageously carried out without a thermal heat source, by means of heat caused by friction due to mechanical stimulation, advantageously by vibrations. The frequency of the vibrations is typically located at the upper end of the audible region or in the ultrasonic region. With heat caused by friction the material can be melted in a controlled way. By application of pressure the filling of pores and cavities in the surface to be sealed is achieved. Due to the large shearing effect the melted material has a very low viscosity, such that even capillary cavities are filled. The depth of penetration of a specific material can be adjusted, among others, by adjusting frequency and amplitude or duration of the application of the vibration. The method is applicable to practically all surfaces of a body. With a suitable arrangement it is possible to seal large surfaces continuously or in sections. The method can be applied in stationary or in flexible manner. By means of suitable devices it is, for example, possible to seal large surfaces (e.g. floors of gymnasiums, any type of lining, etc.). The material used for sealing can, if required be provided with decorative elements such as patterns or images. It is, for example, possible to seal a carrier with a film with color print, such that the impression of a real parquet floor is created. A decorative layer can also be processed separately. It is not a condition of the invention that all areas are sealed. Rather, in certain cases it is sufficient for critical areas only to be treated with the method of the present invention.

The method is advantageously used for sealing surfaces of porous, fibrous materials such as wood, chipboard, cork, cardboard, fiberboard and also concrete, clay, etc. The invention is characterized, among other things, in that it is applicable for continuous processing. Because no solvents are required the method does away with lengthy drying periods and complicated apparatuses for drying. The invention takes advantage of the short and locally restricted melting of an advantageously thermoplastic material. It is advantageous that, due to the very short melting and cooling periods, no significant waiting periods arise. Furthermore, due to the short processing time, the melted material is processed in an extremely sparing manner.

The characteristics of the surfaces can be adjusted by means of applying several films. It is, for example, possible to combine a first layer with decorative patterns with a further layer that is particularly resistant to abrasion. This multi-layer technology can be applied in one or several process steps. As the used materials are usually such that they can be melted thermally it is possible to apply several layers at intervals. Functional edges (plug or snap connections) can be sealed permanently.

Surfaces treated according to the invention can also be connected together by renewed, mechanical stimulation resulting in an effect with further depth. Thus, it is possible to stimulate flooring that consists of a plurality of individual parts (slabs, tiles, boards) with edges being in mutual contact with each other, such that these edges are permanently bound to each other. In addition, or as an alternative, other means for connecting such edges, adhesives can also be used.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
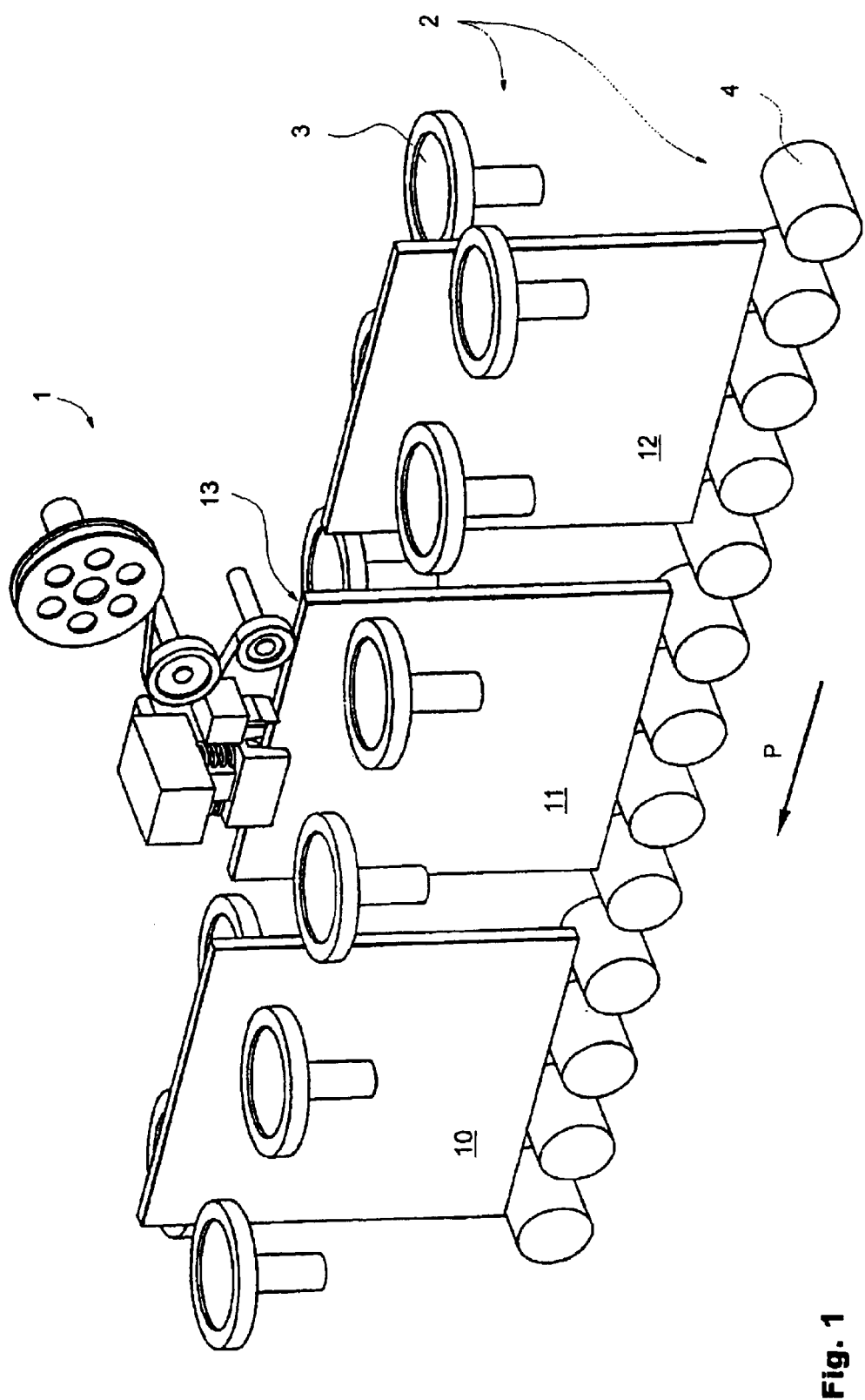
FIG. 1 shows a diagrammatic overview of the inventive method.

FIG. 1 shows, in a diagrammatic manner, main steps of the method according to the invention. Panels 10, 11, 12 are shown, the top sides 13 or the narrow sides respectively of which are sealed. Panels 10, 11, 12 are guided past a processing device 1 by conveying means 2 in the direction of arrow P. The conveying means 2 consist of a plurality of conveying rollers 3 and 4 that are rotatable around their axes and are in interaction with the panels 10, 11, 12 such that they support the panels 10, 11, 12 and guide them past the conveying device 1. The conveying means 2 are mounted on supports which, for clarity reasons, are not shown in detail and they are driven by a corresponding drive (not shown in detail), such as a chain drive, an electric motor, or a hydraulic drive.

Figure 2:
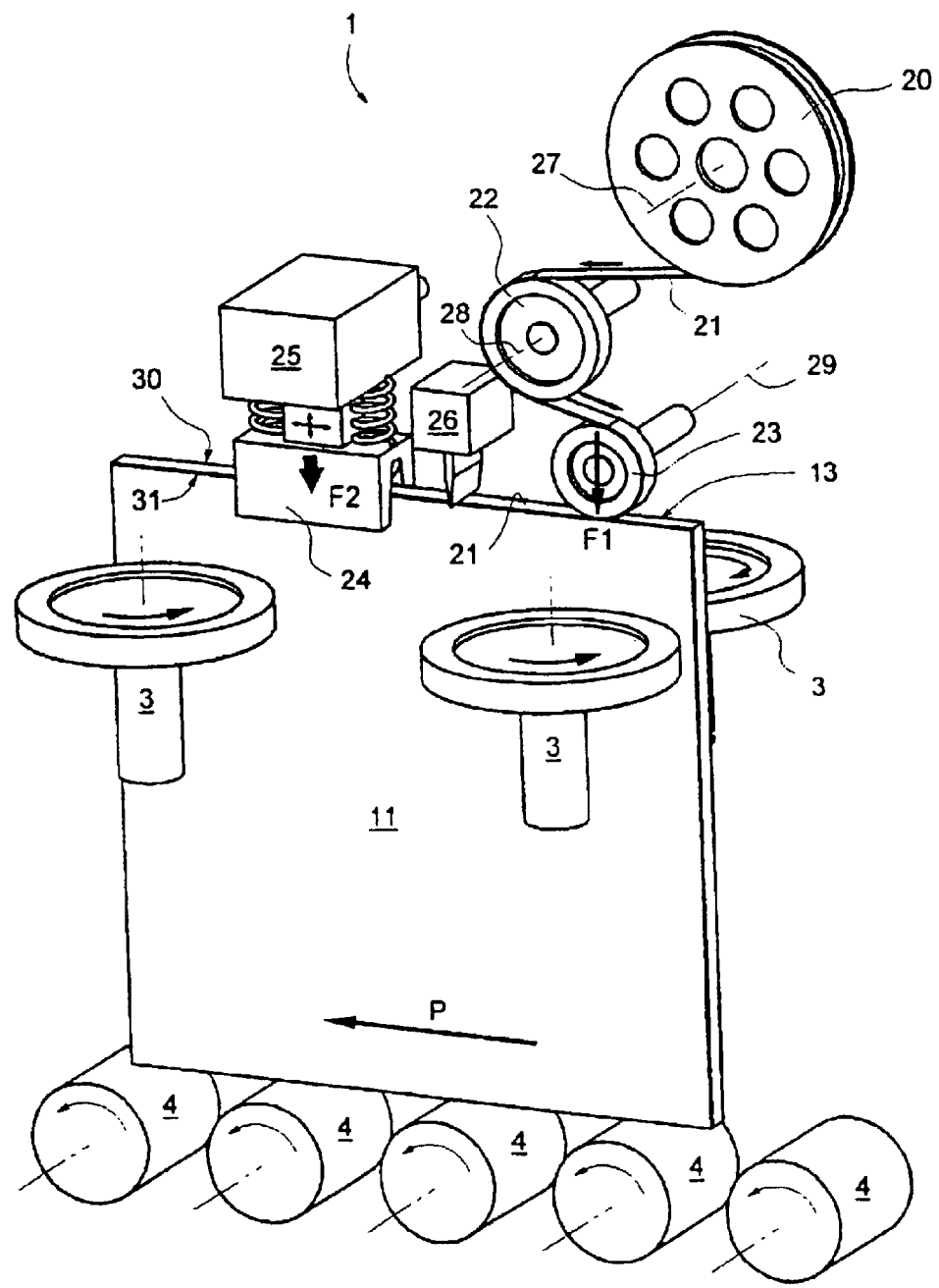
FIG. 2 shows a detail of FIG. 1.

FIG. 2, which is an enlarged view of a portion of FIG. 1, shows the processing device 1, a panel 11 being processed and conveying rollers 3 and 4. A storage reel 20, onto which a tape 21 is wound, serves as a storage device. The tape 21 is unwound over first and second guiding rollers 22, 23 and is positioned on the surface to be sealed. The second guiding roller 23 presses the tape 21 onto the surface 13 of the panel 11 with a specified force F1. The movement of guiding rollers 22, 23 and storage reel 20 are matched to each other such that the tape 21 is transferred to the surface 13 to be sealed and, if so required, is subject to a predetermined tension. The storage reel 20 and guiding rollers 22, 23 are rotatably mounted around axes 27, 28, 29, respectively. The processing device 1 is mounted in stationary manner and the panel 11 moves in relation to it in the direction of arrow P and guided by guide means 3, 4. After passing below roller 23, the panel 11 passes a sonic head 24, which is functionally coupled with the panel 11 and the tape 21. The tape 21 is connected with the surface 13 through temporary melting. The melting is advantageously carried out via mechanical stimulation such that the tape 21 and/or the surface 13 is melted partially due to friction heat. By means of pressure, shown diagrammatically by an arrow F2, the melted materials are additionally connected. The sonic head 24 is designed such that it corresponds to the surface to be processed. Accordingly, the surface to be processed, especially in the region around the edges 30, 31, is sealed effectively. The sonic head 24, in this embodiment protrudes over edges 30, 31 of panel 11. Thus, it is also possible to process tapes 21 that are wider than the thickness of the panel 11, such that the sealing reaches beyond the surface 13. An overlap of several layers is possible. If required, sonic heads with other characteristics can be used. The resonator 24 is brought into vibration by an actuator 25. The stimulating vibrations are advantageously generated by means of a piezo-element (not shown in detail) coupled to sonic head 24 (sonotrode). Depending on the field of application other sorts of mechanical stimulation can be used. At the end of panel 11 a trimming device 26 cuts off the tape 21. The trimming device 26 is advantageously designed such that it positions the tape 21 for processing the next panel 12 (see FIG. 1).

Figure 3:
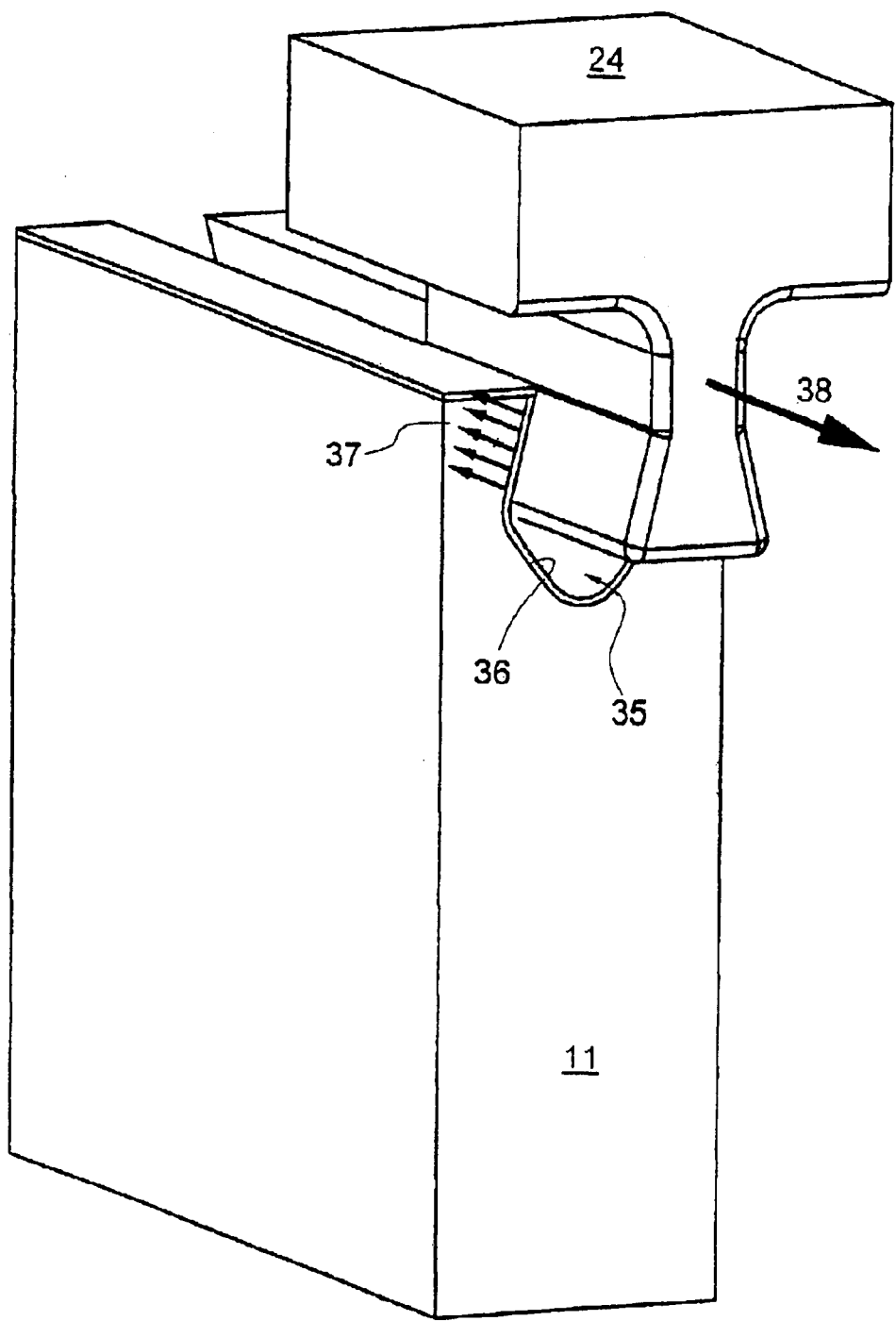
FIG. 3 shows the application of the method to a groove.

FIG. 3 shows, in a very simplified manner, how a profiled groove 35 of a panel 11 is sealed. The groove 35 is part of a snap or plug connection for connecting the panel 11 to further panels or other bodies (not shown in detail) being formed accordingly. Processing of this counterpart is carried out in analogy to the method described here and therefore is not explained in detail.

A tape 21 is pressed against a surface 35 of a panel 11 by means of a sonic head 24. Due to the friction heat generated by vibration of sonic head 24 the advantageously thermoplastic tape 21 (or an equivalent material with a corresponding coating) is temporarily melted and pressed into the surface 36. This process is indicated diagrammatically by arrows 37. The sonic head 24 is pressed against surface 36 of groove 35, furthering penetration of the melted material into the surface. Beforehand, the tape 21 is brought into groove 35 in a continuous manner and, if necessary, is fixed by suitable means, in order to prevent unwanted shifting. The (relative) movement between panel 11 and sonic head 24 during processing is shown by an arrow 38. The sonic head 24 enters the groove 35 at the beginning of the groove 35. Further sonic heads are used for sealing other surfaces (not shown in detail). The sonic head 24 has a shape that is adapted to the surface to be sealed, and is advantageously designed such that a plurality of surfaces can be processed simultaneously. Undercuts can also be treated with suitably designed sonic heads. The sealing of the surface is carried out continuously or in sections. The other surfaces are processed with accordingly shaped sonic heads (not shown in detail). The design of the sonic heads determines the pressure exerted on the surface. A sonic head can comprise several parts, movable relative to each other, such that it adapts to the outline. Snap or plug connections between parts can be made permanent and tight by renewed melting of the sealing material.

The specialist may, with knowledge of the present invention, apply it to other bodies and their surfaces.

What is claimed is:

1. A method of sealing a panel comprised of a porous material and having a non-planar edge, said method comprising the steps of:

providing a sealing strip comprising a thermoplastic material;

providing a sonic head that corresponds to the non-planar edge of the panel;

placing the sealing strip on the non-planar edge of the panel;

pressing the sonic head against the sealing strip disposed on the non-planar edge of the panel;

applying mechanical stimulation to the sealing strip through the sonic head so as to melt the sealing strip; and moving the sonic head relative to the panel such that the sonic head moves over the sealing strip disposed on the non-planar edge of the panel.

2. The method of claim 1, wherein the sonic head is moved relative to the panel while being pressed against the sealing strip and while applying the mechanical stimulation to the sealing strip.

3. The method of claim 2, wherein the step of moving the sonic head relative to the panel comprises moving the panel while holding the sonic head stationary.

4. The method of claim 3, wherein a second edge of the panel is supported on a structure when the panel is moved, said second edge being disposed opposite of the non-planar edge upon which the sealing strip is disposed.

5. The method of claim 4, wherein opposing major faces of the panel extend vertically when the panel is moved.

6. The method of claim 1, wherein the non-planar edge of the panel comprises a groove, and wherein the sealing strip is disposed in the groove.

7. The method of claim 6, wherein the sonic head enters the groove.

8. The method of claim 1, wherein the non-planar edge of the panel comprises a snap or a plug that cooperates with a groove in an edge of another panel to form a connection.

9. The method of claim 1, wherein the porous material of the panel is selected from the group consisting of wood, chipboard, cork, cardboard and fiberboard.

10. The method of claim 9, wherein the sealing strip comprises a plurality of layers.

11. The method of claim 9, wherein the sealing strip comprises decorative elements.

12. The method of claim 1, wherein the sealing strip comprises a plurality of layers.

13. The method of claim 12, wherein the sealing strip comprises decorative elements.

14. The method of claim 1, wherein the sealing strip comprises decorative elements.

* * * * *